UNITED STATES PATENT OFFICE.

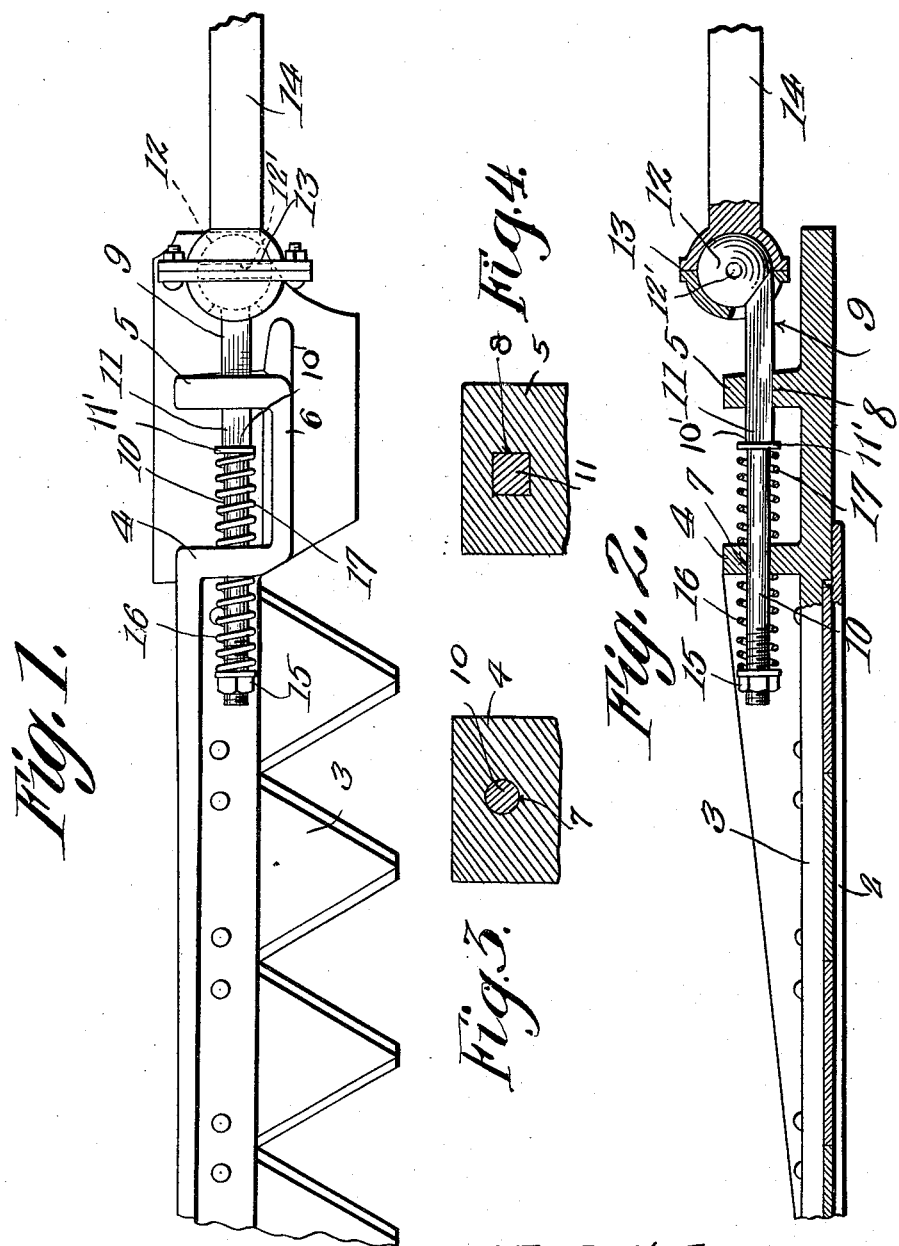

WILLIE P. COKER, OF CORDELL, OKLAHOMA, ASSIGNOR OF ONE-THIRD TO WILLIAM E. SHEETS AND ONE-THIRD TO ELMER L. RILEY, BOTH OF CORDELL, OKLAHOMA.

YIELDABLE PITMAN.

1,128,413.      Specification of Letters Patent.      Patented Feb. 16, 1915.

Application filed September 13, 1913. Serial No. 789,694.

*To all whom it may concern:*

Be it known that I, WILLIE P. COKER, a citizen of the United States, residing at Cordell, in the county of Washita and State of Oklahoma, have invented a new and useful Yieldable Pitman, of which the following is a specification.

This invention relates to improvements in cutter head attachments, one of the objects being to provide a cutter bar for a reaping or mowing machine in which the machine may be started or stopped suddenly without damage to the cutter bar.

A further object is to provide a cutter bar which will eliminate to a large degree the breaking of the bar in heavy grass or due to a sudden stopping of the machine such as will be caused by the mowing or reaping machine suddenly encountering some obstacle.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a top plan view of the shoe of the finger bar of an ordinary mowing machine, including my improved cutter bar attachment secured thereto and a portion of the pitman which operates the latter. Fig. 2 is a longitudinal sectional view of the mechanism illustrated in Fig. 1. Figs. 3 and 4 are sections showing the openings in the upstanding ledges in which the connecting rod is mounted to slide.

Referring to the drawings in which similar reference numerals designate corresponding parts throughout the several views, 2 is the cutter rod and 3 is the cutter bar and is provided with upstanding ledge 4 extending transversely thereacross and spaced from which is a second transverse upstanding ledge 5, the two ledges being connected by the intermediate ledge or web 6.

Upstanding ledges 4 and 5 are provided with alined apertures 7 and 8 extending therethrough and which slidably receive the connecting rod 9 therein. The aperture 7 is of circular outline and receives the cylindrical portion 10 of the connecting rod therein. The aperture 8 is somewhat larger than the aperture 7 and is of square or rectangular contour and slidably and non-rotatably receives the squared or rectangular portion 11 of the connecting rod therein. A shoulder 10' is formed between the two portions 10 and 11, as shown.

The outer extremity of the square portion 11 of the connecting rod is provided with the ball 12 which coacts with the socket 13 of a pitman 14 whereby a universal joint is had between the pitman 14 and the connecting rod 9. An eye or aperture 12' extends through the ball 12 and provides means whereby a pitman may be pivotally connected to the connecting rod 14 by means of a pin. Thus a pitman can be secured to the connecting rod even though it is not provided with a ball and socket joint, which allows my improved device to be operatively connected to machines already in service.

The remote extremity of the connecting rod 9 is provided with a threaded end engaging which is a nut 15 and which nut bears against a helical spring 16 the opposite end of which abuts the ledge 4. A second helical spring 17 is positioned between the ledge 4 and the shoulder 10' dividing the round portion 10 and square portion 11 of the connecting rod.

A washer 11' is preferably mounted on the cylindrical portion 10 of the connecting rod and bears against the shoulder 10' thus to provide an efficient bearing for the spring 17. In assembling the connecting rod and the cutter bar, the cylindrical end of the rod is inserted through the ledge 5, and the ring or washer 11' and spring 17 are then placed between the ledges 4 and 5 after which the cylindrical portion 10 is inserted through them and through the ledge 4. Spring 16 is then placed in position after which the parts are adjusted by means of the nut 15.

The cutter bar and connecting rod resiliently connected thereto possesses many desirable features among the more advantageous of which is the non-rotatable manner in which the connecting rod is supported and which prevents the ball 12 from rotating about the connecting rod 9 as an axis, which would tend to throw the pitman 14 out of alinement therewith. Furthermore the connecting rod is adapted to transmit a force from the pitman 14 to the cutter bar 3 through the intervention of the springs 16 and 17 whereby any jar or sudden stoppage of the machine will be successfully taken up by the said helical spring to thereby eliminate the breaking of the parts which usually accompanies such procedures. As is well known the cutter bar is adapted to travel at high speed with relation to the speed of the machine and should the machine be suddenly started, or should the machine while in motion encounter some obstacle and suddenly stop, the various stresses and strains will be taken up by the springs and the ledge 4 whereby the stresses or strains will at no time rise to dangerous proportions. The tension or compression upon both springs may be adjusted by the adjusting of the single nut 15, as will be readily appreciated from a reference to Fig. 2 of the drawings.

Having thus described my invention, what I claim is:—

In an apparatus of the class described, a plate with spaced upstanding ledges and a web extending therebetween embracing said plate and holding said ledges in spaced relation, said ledges provided with alined cylindrical and polygonal apertures extending therethrough respectively, a connecting rod including a polygonal portion slidably and non-rotatably engaging said ledge polygonal aperture, a cylindrical portion with an outstanding shoulder slidably engaging said ledge cylindrical aperture, a helical compression spring disposed upon said rod cylindrical portion abutting the said shoulder and a ledge, and a second helical compression spring disposed upon said rod cylindrical portion contacting with the other side of said ledge, with respect to the aforementioned spring, adjustable means carried at the extremity of said rod cylindrical portion and contacting with the second mentioned spring and varying the compression thereof, said connecting rod adapted to transmit a force to said plate through springs and ledges, said ledges and web uniformly distributing said force throughout the plate, and means carried by and offset from said connecting rod adapted to universally engage a pitman for the actuation of the former by and with the latter.

In testimony that I claim the foregoing as my own, I have hereto affixed my signature in the presence of two witnesses.

WILLIE P. COKER.

Witnesses:
E. L. RILEY,
W. F. LOYD.

Copies of this patent may be obtained for five cents each, by addressing the "Commissioner of Patents, Washington, D. C."